Jan. 6, 1925. 1,522,285
L. W. CHISM
HOOK AND GUARD THEREFOR
Filed Dec. 23, 1921  2 Sheets-Sheet 2
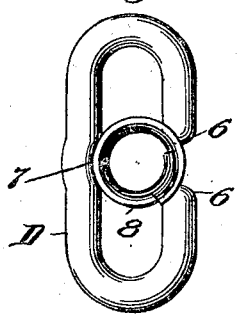
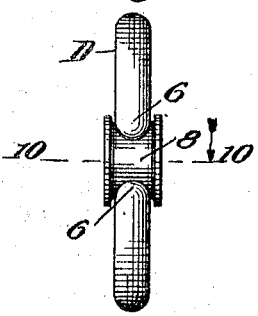
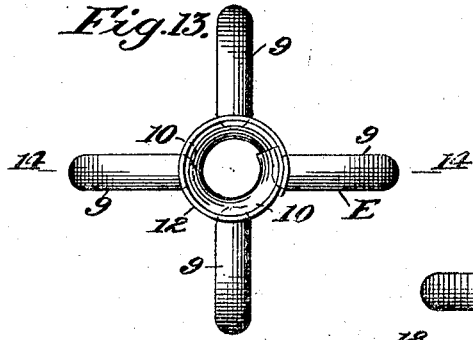
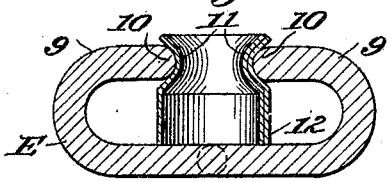
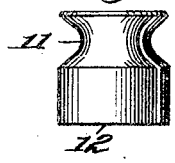
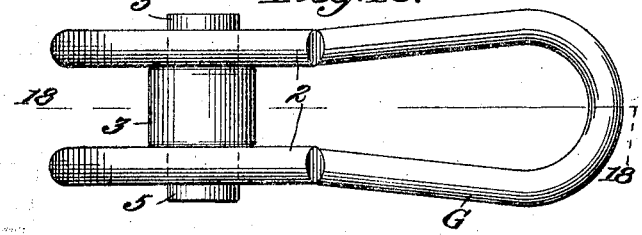
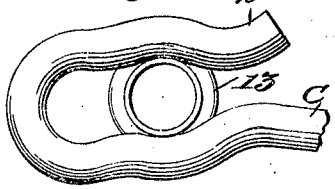
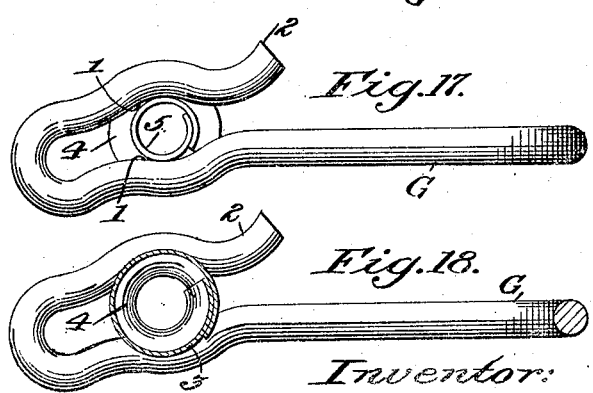
Inventor:
Louis W. Chism,
by Richard E. Babcock
Atty.

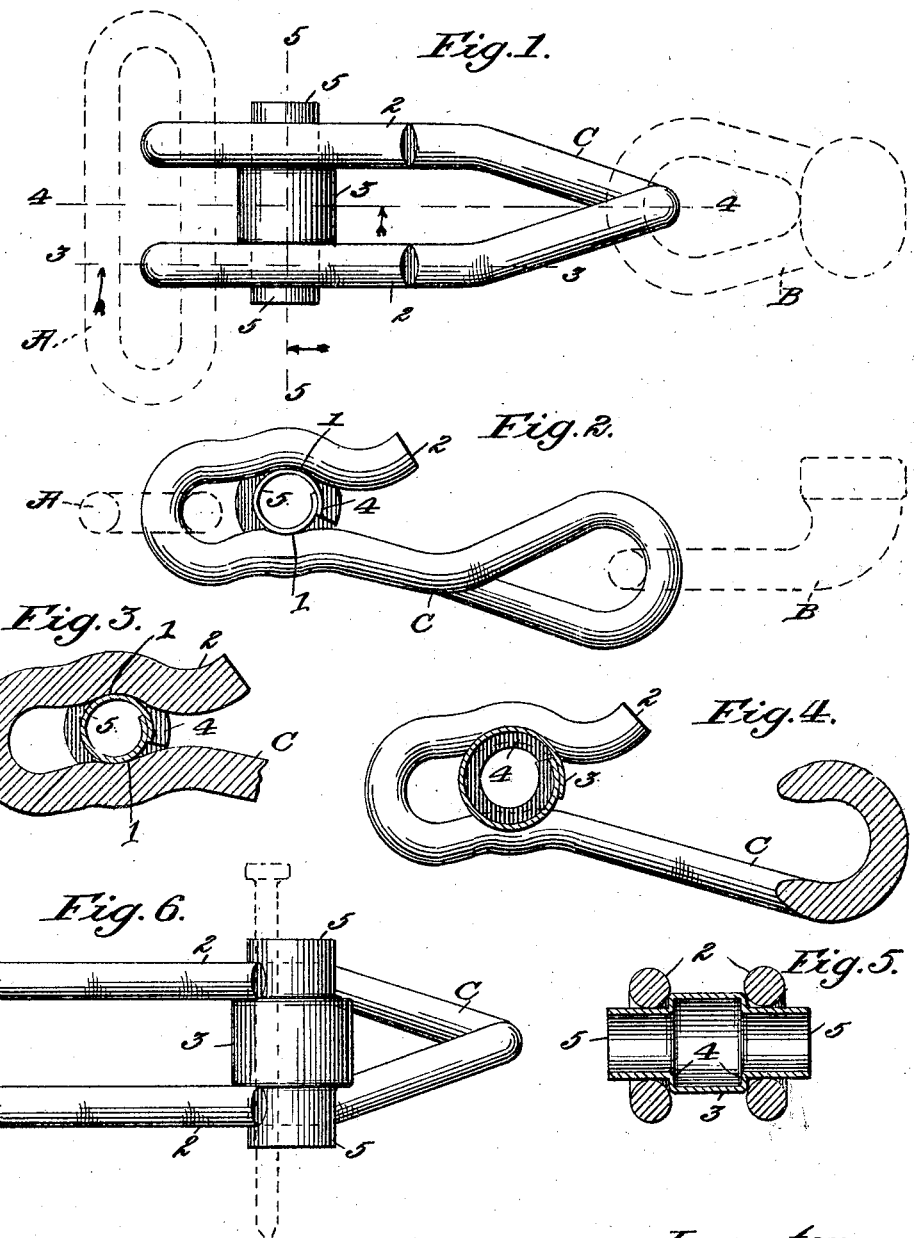
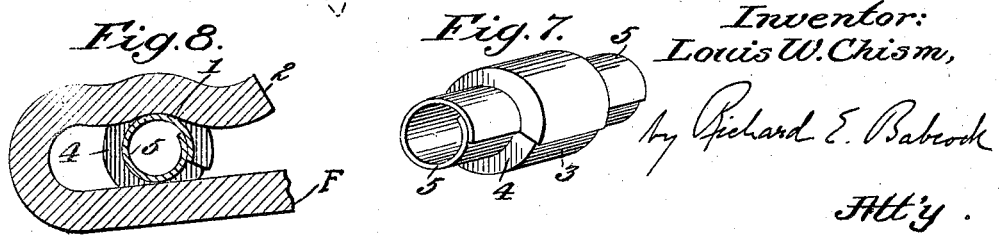

Patented Jan. 6, 1925.

1,522,285

UNITED STATES PATENT OFFICE.

LOUIS W. CHISM, OF SPRINGFIELD, MASSACHUSETTS, ASSIGNOR OF THREE-TENTHS TO RICHARD E. BABCOCK, OF WASHINGTON, DISTRICT OF COLUMBIA.

HOOK AND GUARD THEREFOR.

Application filed December 23, 1921. Serial No. 524,551.

*To all whom it may concern:*

Be it known that I, LOUIS W. CHISM, a citizen of the United States, residing at Springfield, in the county of Hampden and State of Massachusetts, have invented certain new and useful Improvements in Hooks and Guards Therefor, of which the following is a specification.

This invention relates to hooks or connecting elements and to guarding means, or a keeper or closure or locking means therefor to prevent the escape of a connected element, such as, for instance, a chain link, therefrom, and has especial relation to anti-skidding devices, which field is primarily in view for the most extensive use of the present invention the invention being developed with the especial view of using it to connect the cross-chains of a creeping type of anti-skid chain to the side chains thereof, and to connect the terminal portions of the respective side-chains to each other, and also to connect the cross-chains to other elements of other types of anti-skid assemblages. However, the invention herein described is not limited in use to the above referred to particular field, but is capable of general utility.

Heretofore it has been the usual practice to simply clinch the points of the terminal hooks or loops over the side-bar of one of the links of the side-chain, but this has required special tools both to apply and to remove and has made it impractical for the ordinary automobile operator to remove a broken cross-chain on the road, much less to apply a new cross-chain. To overcome this objection various snap-hook devices and separable fasteners have been proposed, but they have themselves had so many inherent objections and faults and have so signally failed to meet the situation that they have never come into any appreciable use.

The objects of the present invention are to avoid the objections inherent in the first mentioned and common mode of connection, that is, the clinching method; to avoid the objections and imperfections inherent in the snap-hook and separable connector devices heretofore proposed for this purpose, and to provide an extremely simple, most dependable, and extremely cheap connector and closure, guarding, or locking means therefor, said closure, guarding or locking means being bodily separable as an element of said connector and only being inserted into, or removed from, operative position by pressure exerted internally outwardly, and being so formed that it will automatically tighten up in its position closing said hook by pressure exerted upon it externally inwardly.

For the purpose of making clear the manner of constructing and using my invention so as to enable others skilled in the art to which it appertains to make, construct and use the same, I have illustrated in the accompanying drawing several different embodiments of my said invention by way of example or illustration, it being recognized, however, that my said invention is capable of being embodied in a variety of other and different forms.

In the accompanying drawings:

Figure 1 represents a front elevation of a device embodying the form of my invention preferred for the purpose of connecting the cross-chains to the side-chains of a creeping type anti-skid chain, a link of the cross-chain and a link of the side chain being indicated in dotted lines;

Figure 2, a side view of the device shown in Figure 1;

Figure 3, a sectional view on the line 3—3 of Fig. 1, looking in the direction of the arrows;

Figure 4, a sectional view on the line 4—4 of Fig. 1, looking in the direction of the arrows;

Figure 5, a sectional view on the line 5—5 of Fig. 2, looking in the direction of the arrows;

Figure 6, a side plan view of the device while the guarding or locking means or closure is being inserted into, or removed from, operative position, the nail or other slender article used for this purpose being indicated in dotted lines;

Figure 7, a detail perspective view of the guard or closure means shown in Figure 1;

Figure 8, a view similar to Figure 3, of a modified form in which the legs of the hooks are not recessed;

Figure 9, a side elevation of a modified, double-hook, form;

Figure 10, a sectional view on the line 10—10 of Figure 11, looking in the direction of the arrows;

Figure 11, an edge elevation of the form shown in Figure 9;

Figure 12, a detail view of the guard or closure means shown in Figure 9;

Figure 13, a front elevation of a further modified, multiple-hook, form of connector, in which the closure or guarding means is arranged with its axis at right angles to its position in the forms shown in the preceding views;

Figure 14, a sectional view on the line 14—14 of Figure 13;

Figure 15, a detail view of the guard or closure means shown in Figures 13 and 14;

Figure 16, a view similar to Figure 1 of a different form of hook with the form of my closure means illustrated in Figures 1 to 8 combined therewith;

Figure 17, side elevation of the embodiment illustrated by Figure 16;

Figure 18, a sectional view on the line 18—18 of Figure 16; and

Figure 19, a detail side elevation of a portion of a hook, broken away, showing a modified form of keeper or closure means combined therewith.

Referring now in detail to the accompanying drawings, B indicates one of the links of the cross-chain, one of the terminal links thereof as distinguished from the connector forming the subject matter of the present invention; A one of the links of the side-chain and C the connector, hook or link connecting the cross-chain to the side-chain.

The connector C is shown in the accompanying drawings as of the usual strap or wire hook type, having its central portion bent into a loop and its two ends bent so as to form substantially parallel legs and its extreme end portions bent into substantially parallel adjacent hooks 2, each hook having its axis substantially parallel to, and in the same transverse plane with, its respective leg of said connector. Said connector C is threaded through the terminal link B of the cross-chain, as usual, so as to receive the latter in its central loop, as shown.

It has the lower portions of the legs of the loop and the opposing registering portions of the end hooks provided with reversely presented registering concave recesses 1, these recesses being formed simply by bending the wire stock, from which the connector C preferably is formed, bodily in the shaping or forming or bending operations.

As thus formed the hooks 2 will preferably be spaced slightly from each other, with the legs of the loop lying opposite to said hooks, forming a trough. The free ends of the hooks 2 will be inserted through the link A of the side chain, one of the side-bars of such link A lying in such trough.

The keeper, guard, closure or locking means is then to be inserted into position.

This keeper or locking means is, preferably, though not necessarily, formed of a resilient sheet metal roll, of which the side edges overlap to a sufficient degree to allow the keeper or locking means to expand or contract as necessary, and because of its resiliency, to accommodate itself to the slightly varying distances between the sides of the above defined trough such as will often be found to be present in articles of this nature produced in large quantities as contemplated, though, of course, the range of variations will be small.

In so expanding or contracting the said locking means or guard or closure will retain its cross-sectional circular shape and the opposite portions of its outer face will engage positively in the oppositely presented concave recesses 1 in the opposite sides of the trough, that is, in the legs of the loop and in the hooks 2.

This guard or closure will be of relatively thin, light springy material, preferably sheet metal, as above mentioned, so as to be easily temporarily deformed or slightly flattened out, so that any pressure exerted by either link A or link B on the exterior of the guard or closure will flatten it slightly or elongate it transversely on a line passing through the centers of said opposing recesses 1, thus causing it to automatically jam into tighter engagement with the faces thereof and so hold links A and B securely connected together notwithstanding such pressure upon the guard or closure.

However, just the reverse follows when the pressure is exerted from the interior of the locking means or guard, for in such case it will readily yield outwardly, will elongate in its cross-sectional form and may thus be easily drawn through a narrow opening or interval, a nail or like thin instrument being employed for this purpose and inserted into the locking means or guard to deform it, as illustrated in Figure 6, in inserting it and in removing it.

In order to maintain this guard or locking device in position in the embodiment illustrated in the first eight views of the drawing I form it with a central portion 3 lying between hooks 2, shoulders 4 engaging the opposing faces of the inner sides of the hooks 2 and reduced ends 5 extending well beyond the respective shoulders 4 and engaging the faces of the recesses 1.

In the form illustrated in Figure 8 the leg of the connector F is unrecessed, otherwise the construction and operation is the same as above described.

In the form illustrated in Figures 9, 10, 11 and 12 I have shown a double-hook D having its hook-tips 6 in adjacency to delimit a single passage or opening between them, and its hooks and connecting body portion all flat and in the same plane.

The body portion is provided at a point directly opposite to the interval between its hoop-tips 6 with a concave recess 7, the arc of which is struck on an imaginary circle intersected to an equal degree by both said hook-tips 6. A guard or locking means 8, preferably of sheet metal, U-shape in cross section, resilient and rolled into the form of a cylinder with overlapping ends, and having the characteristics hereinbefore mentioned with relation to the first described embodiment of the invention, is then inserted, in the manner heretofore described, so that its exterior engages the face of the recess 7 and the opposed faces of the hook-tips 6, which tips 6 and recessed portion are received in the outer U-shape annular channel of the keeper 8 and so prevent the latter from being dislodged, in an axial direction, from its operative position.

In the form shown in Figures 13, 14 and 15, a connector E having a plurality of hooks 9, is shown, the tips of all of said hooks preferably lying at points of a common circle, and a keeper formed with an annular channel 11 and a skirt 12 is employed, in this form being arranged with its axis at right angles to the direction of the axis of the keeper of the embodiments illustrated in the first twelve views. The channel 11 receives the tips 10 of the hooks 9 and skirt 12 extends down to, and engages with, the body of the connector E, as shown, to prevent any of the connected links or elements from getting between the body of the connector E and the adjacent end of the guard and so exerted an endwise pressure on the keeper or guard.

Otherwise the guard or keeper or locking means of this form is formed the same, and has the same characteristics and attributes, as the keepers or locking means of the forms or embodiments illustrated in the first twelve views.

In the modification illustrated in Figures 16, 17 and 18 I have shown the invention as embodied in a slightly different form of connector G for use with twisted-link cross-chains which are so constructed that the free terminal loop of the terminal links of said cross-chains will normally lie edgewise to the tire to which the anti-skid assemblage is to be applied. Otherwise, the construction and operation are the same as in the form shown in Figures 1 to 7 inclusive.

In the modification illustrated in Figure 19, I have shown a truly cylindrical keeper or guard 13 endless in cross-section, the construction and operation being otherwise the same as in the form illustrated in Figures 1 to 7 inclusive.

The keepers above described may be of any material suitable to the purpose, metal or any other suitable material, and may be produced in any suitable and convenient manner. One way is to form them up from thin sheet metal stock and then, as thus formed, treat them to give them the desired degree of temper and resiliency. However, in suggesting the above mode of production it is to be understood that this is merely one manner at present considered to be practicable, and of course it is to be understood that they are to be produced in whatever suitable manner may be selected, and from any material, suitable to the purpose, that may be selected.

Since the keepers, guards or locking means are bodily removable from, and insertable into, the connectors or hooks, such keepers or locking means or guards are, as to each particular form, easily interchangeable and easily replaced, in this partaking somewhat of the character of cotter pins and lock-washers, and it is intended at the present time to market these guards or locking means in packages separate from the connector hooks, for replacement purposes similar to the manner in which cotter-pins and the like are now distributed; to make up packages of sets of the guards and connectors or hooks for distribution as sets, and also to make up complete cross-chains for sale embodying therein the present invention.

Having thus described my invention, what I claim as new and desire to secure by Letters Patent is:

1. As a guard for connectors of the type having a hook, a yieldable, resilient, tubular, substantially cylindrical device which, in arranged relation, is adapted to engage a hook of a connector and a part fixed with relation thereto, and which is provided with annular portions preventing axial displacement.

2. As a guard for connectors, a yieldable, resilient, tubular, device adapted, in arranged relation, to engage opposed faces of a connector in one plane, and the faces of portions of a connector in a plane at an angle to the first mentioned plane.

3. As a guard for connectors, a yieldable, resilient metal, tubular, device adapted, in arranged relation in said connector, to engage opposed faces of a connector in one plane, and the faces of portions of a connector in planes at angles to the first mentioned plane.

4. As a guard for connectors, a yieldable resilient hollow bodily applicable and removable device adapted, in arranged relation in a connector, to slightly flatten out, under external pressure, into tighter engagement with a connector, but easily elongated in cross-section by the application of pressure at any one point against its interior face outwardly for the purpose of positioning or removing said device.

5. As a guard for connectors, a yieldable resilient metallic hollow device adapted, in arranged relation in a connector, to slightly flatten out, under an inwardly directed external pressure, into tighter engagement with a connector, but easily elongated in cross-section by the application of pressure against its interior face outwardly for the purpose of positioning or removing said device.

6. In combination, a hook having its opposed faces provided with registering concave recesses, and a yieldable resilient substantially cylindrical hollow device bodily insertable into position wherein it engages the faces of said recesses with opposite portions of its exterior face, the said device resisting, in progressive degree, external pressure and readily yielding to internal pressure directed outwardly.

7. In combination, a hook and a bodily insertable and removable and separable guard therefor, said hook and guard being so formed as to have positive engagement with each other preventing the accidental displacement of said guard from its normal position.

8. In combination, a hook and a bodily insertable and removable and separable guard therefor, said hook and guard being formed to have engagement with each other such as to prevent the accidental displacement of said guard from its normal position, said guard being of resilient yieldable material.

9. In combination, a hook and a bodily insertable and removable and separable guard therefor, said hook and guard being formed to have engagement with each other such as to prevent the accidental displacement of said guard from its normal position, said guard being of resilient yieldable material and tubular in form.

10. In combination, a hook having its opposed faces provided with registering concave recesses, and a yieldable resilient substantially cylindrical hollow device bodily insertable into position wherein it engages the faces of said recesses with opposite portions of its exterior face, the said device being formed with shoulders adapted to engage adjacent faces of said hook to prevent accidental displacement of said device in a direction of its axis.

11. In combination, a connector having two opposed hooks having their tips arranged in adjacency to delimit a single passage between them, the body of the connector being provided with a concave recess registering with the opening between said hooks, and a resilient, yieldable, hollow guard engaging the opposing faces of said recess and said hook-tips and provided with means engaging the sides of said hooks and said recessed portion to prevent the accidental displacement of said guard in a direction of its axis.

12. In combination, a connector comprising a body portion and a plurality of hooks having their tips in adjacency, and a tubular resilient yieldable guard provided with an annular groove to receive and guard the tips of said hooks, which hooks also prevent the displacement of said guard in a direction axially thereof, the said guard having a skirt portion extending adjacent to the opposed face of the body portion to prevent any of the connected elements from working between said body portion and the adjacent end of said guard and bearing on the said end of said guard to axially displace the latter.

Signed at Springfield, in the county of Hampden and State of Massachusetts, this 9th day of December, 1921.

LOUIS W. CHISM.